(12) United States Patent
Paila et al.

(10) Patent No.: US 8,412,187 B2
(45) Date of Patent: Apr. 2, 2013

(54) BROADCAST ROAMING

(75) Inventors: Toni Paila, Stamford, CT (US);
Franceso Balestrieri, Helsinki (FI);
Topi Pohjolainen, Helsinki (FI)

(73) Assignee: Nokia Corporation (FI)

( * ) Notice: Subject to any disclaimer, the term of this patent is extended or adjusted under 35 U.S.C. 154(b) by 1033 days.

(21) Appl. No.: 11/933,648

(22) Filed: Nov. 1, 2007

(65) Prior Publication Data

US 2008/0102828 A1 May 1, 2008

Related U.S. Application Data

(60) Provisional application No. 60/855,735, filed on Nov. 1, 2006.

(51) Int. Cl.
*H04W 4/00* (2009.01)
(52) U.S. Cl. ............ 455/432.1; 455/422.1; 370/328; 370/338
(58) Field of Classification Search ....... 455/432.1–433, 455/412.1, 412.2, 422.1
See application file for complete search history.

(56) References Cited

U.S. PATENT DOCUMENTS

| | | | | |
|---|---|---|---|---|
| 2004/0158618 | A1* | 8/2004 | Shaw | 709/217 |
| 2005/0227739 | A1* | 10/2005 | Dowling et al. | 455/566 |
| 2006/0034215 | A1 | 2/2006 | Moon et al. | |
| 2007/0093202 | A1* | 4/2007 | Hwang et al. | 455/3.06 |
| 2007/0202874 | A1* | 8/2007 | Shon | 455/433 |

FOREIGN PATENT DOCUMENTS

| | | |
|---|---|---|
| EP | 1 841 253 A1 | 10/2007 |
| WO | 03/003704 A2 | 1/2003 |
| WO | 2006014076 A1 | 2/2006 |
| WO | 2006/075399 A1 | 7/2006 |

OTHER PUBLICATIONS

Mobile Broadcast Services, Draft Version 1.0, Apr. 19, 2006, OMA-TS-BCAST_Services-V1_0-20060419-D, Open Mobile Alliance, pp. 1-80.
Mobile Broadcast Services, Candidate Version 1.0, Sep. 25, 2007, OMA-TS-BCAST_Services-V1_0-20070925-C, Open Mobile Alliance, pp. 1-151.
Mobile Broadcast Services, Draft Version 1.0, Dec. 29, 2006, OMA-TS-BCAST_Services-V1_0-20061229-D, Open Mobile Alliance, pp. 1-125.
Canadian Patent Application No. 2,667,609 Office Action dated Aug. 15, 2011.
Japan Patent Application No. 2009-533979 Office Action dated Nov. 28, 2011, submitted in Japanese with a translation of relevant portions.

(Continued)

*Primary Examiner* — Chuong A Ngo
(74) *Attorney, Agent, or Firm* — Banner & Witcoff, Ltd.

(57) ABSTRACT

Embodiments are directed to broadcast roaming, i.e., providing service/content to a terminal from a visited service provider. An embodiment is directed to sending a roaming rule request to a service provider, receiving a roaming rule response from the service provider, acquiring service guide fragments from the service provider and processing the service guide fragments in accordance with the received roaming rule response, sending to a selected service provider a service provisioning request for a purchase item, receiving from the selected service provider a service provisioning response regarding the purchase item, and accessing service and/or content related to the purchase item, wherein the service and/or content is provided by the visited service provider. Embodiments are directed to exchanging between a visiting service provider and a home service provider of the terminal a roaming authorization request regarding a purchase item and a roaming authorization response regarding the purchase item.

29 Claims, 4 Drawing Sheets

OTHER PUBLICATIONS

Vietnamese Patent Application No. 1-2009-01134—Office Action dated Aug. 28, 2012.

Canadian Patent Application No. 2,667,609—Office Action dated Aug. 13, 2012.

The Second Office Action for Chinese patent application No. 200780048924.7 dated Dec. 5, 2012.

* cited by examiner

BROADCAST ROAMING

CROSS REFERENCE TO RELATED APPLICATIONS

This application claims the benefit of U.S. Provisional Application No. 60/855,735, which was filed Nov. 1, 2006, and which is incorporated herein by reference.

FIELD

Embodiments relate to mobile broadcasting and specifically roaming associated with mobile broadcast services and user mobility.

BACKGROUND

Broadcast roaming refers to the ability of a user to receive broadcast services from a Mobile Broadcast Service Provider different from the Home Mobile Broadcast Service Provider with which the user has a contractual relationship.

The current state of the art—OMA BCAST TS Services and OMA BCAST TS Service Guide—defines a method to signal existence of service providers, such as BCAST Subscription Managers (BSMs), which may be responsible for service provisioning such as subscription and payment related functions, the provision of information used for BCAST Service reception, and BCAST device management. The signaling may involve methods of signaling through Service Guide Announcement Sessions and Service Guide Delivery Descriptors (SGDDs) within.

However, the current state of the art specification does not disclose solutions to the following problems:

1) How does a terminal know when it is roaming?
2) Which BSM can a terminal roam to (i.e. which BSM can a terminal select so that the BSM will serve the terminal)?
3) If multiple BSMs are available to serve the terminal, which BSM is the best to use?

For example, see OMA BCAST 1.0 TS Services [Mobile Broadcast Services; Draft Version 1.0 (19 Apr. 2006); OMA-TS-BCAST_Services-V1_0-20060419-D] and OMA BCAST 1.0 TS Service Guide [Service Guide for Mobile Broadcast Services; Draft Version 1.0 (24 Mar. 2006); OMA-TS-BCAST_ServiceGuide-V1_0_0-20060324-D]. The following table contains a partial list and description of elements defined by Amendments to the OMA BCAST 1.0 Service Guide, and specifically, the Service Guide Delivery Descriptor.

| Name | Type | Category | Cardinality | Description | Data Type |
|---|---|---|---|---|---|
| ... | | | | | |
| BSMSelector | E3 | NO/TM | 0 . . . N | This is a BSM code that allows a terminal to determine whether the SGDU's in this SGDD DescriptorEntry - among the SGDU's that are announced in various Descriptor Entries in various SGDD's - is associated with the terminal's affiliated BSM. In case the terminal is equipped with one or more BSMFilterCodes, the BSMSelector acts as an access filter for the SGDU's of the DescriptorEntry and the following applies: Usage in home network: The terminal SHALL only use those SGDU's in the DescriptorEntry that have a matching BSMFilterCode. If the terminal has multiple matching BSMFilterCodes, the terminal MAY select one of the BSMSelectors with a matching BSMFilterCode and SHALL then only use the SGDU's of DescriptorEntries with the selected BSMSelector, until it selects another BSMSelector. If the BSMSelector is not present the | |

| Name | Type | Category | Cardinality | Description | Data Type |
|------|------|----------|-------------|-------------|-----------|
| | | | | terminal SHALL NOT use any of the SGDU's in the DescriptorEntry. Usage in roaming network: If the terminal has a matching BSMFilterCode in any of the SGDD's in this network, then the terminal SHALL only use those SGDU's in the DescriptorEntry. If the terminal has multiple matching BSMFilterCodes, the terminal MAY select one of the BSMSelectors with a matching BSMFilterCode and SHALL then only use the SGDU's of DescriptorEntries with the selected BSMSelector, until it selects another BSMSelector. If the terminal or smartcard does not have a matching BSMFilterCode in any of the SGDD's in this network, the terminal MAY select any BSMSelector and SHALL only use the SGDU's of DescriptorEntries with the selected BSMSelector, until it selects another BSMSelector. If the BSMSelector is not present, the terminal can use all SGDU's in the DescriptorEntry. In case the terminal is not equipped with a BSMFilterCode, the following applies: Usage in home network: The terminal MAY select any BSMSelector that does not contain a BSMFilterCode, and SHALL then only use the SGDU's of DescriptorEntries with the selected BSMSelector, until it selects another BSMSelector. Furthermore, the terminal SHALL NOT use the SGDU's of DescriptorEntries that have a BSMSelector with a BSMFilterCode. | |

-continued

| Name | Type | Category | Cardinality | Description | Data Type |
|---|---|---|---|---|---|
| | | | | If the BSMSelector is not present in any of the SGDD's the terminal can use all SGDU's in the DescriptorEntry. Usage in roaming network: The terminal MAY select any BSMSelector and SHALL then only use the SGDU's of DescriptorEntries with the selected BSMSelector, until it selects another BSMSelector. If the BSMSelector is not present in any of the SGDD's the terminal can use all SGDU's in the DescriptorEntry. BSMSelector contains the following attribute: id BSMSelector contains the following elements: BSMFilterCode name | |
| id | A | NM/TM | 1 | Identifier of the BSMSelector, unique within the network | AnyURI |
| BSMFilterCode | E4 | NO/TM | 0 . . . 1 | The code that specifies this BSMSelector. Contains the following attribute: type | String |
| type | A | NM/TM | 1 | The type of BSMFilterCode. 1 - BSMCode (Smart Card Code) This is used if the determination is made based on the country and operator code in the (U)SIM/(R-)UIM/CSIM 2 - BSMCode (Non Smart Card Code): This is used if the determination is made based on the country and operator code in the terminal Other values are reserved. | unsignedByte |
| name | E4 | NM/TM | 1 . . . N | Provides a user readable name for the BSMSelector, possibly in multiple languages. The language is expressed using built-in XML attribute xml:lang with this element . . . This attribute can be used to provide information to the user so he can select the BSMSelector the terminal has to use. | String |

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Embodiments are directed to broadcast roaming, i.e., providing service/content to a terminal from a visited service provider. An embodiment is directed to sending a roaming rule request to a service provider, receiving a roaming rule response from the service provider, acquiring service guide fragments from the service provider and processing the service guide fragments in accordance with the received roaming rule response, sending to a selected service provider a service provisioning request for a purchase item, receiving from the selected service provider a service provisioning response regarding the purchase item, and accessing service and/or content related to the purchase item, wherein the service and/or content is provided by the visited service provider. Embodiments are directed to exchanging between a visiting service provider and a home service provider of the terminal a roaming authorization request regarding a purchase item and a roaming authorization response regarding the purchase item.

BRIEF DESCRIPTION OF THE DRAWINGS

Other objects and features will become apparent from the following detailed description considered in conjunction with the accompanying drawings. It is to be understood, however, that the drawings are designed solely for purposes of illustration and not as a definition of the limits of the invention, for which reference should be made to the appended claims only. It should be further understood that the drawings are merely intended to conceptually illustrate the structures and procedures described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

An aspect of the invention relates to signaling the query address for each broadcast subscription management (BSM) declared in the BSM. This can be done by adding an element "RoamingQueryAddress" to the SGDD under the element "BSMSelector". Another aspect of the invention relates to determining whether a terminal is roaming. Yet another aspect of the invention specifies the content of a roaming query message and respective answer message. Still another aspect of the invention discloses a method to determine which of the declared BSM(s) is/are best suited to serve a terminal while it is roaming.

Various abbreviations used herein are provided below.

BDS—Broadcast Distribution System

A system containing the ability to transmit the same IP flow to multiple Terminal devices simultaneously. A Broadcast Distribution System typically uses techniques that achieve efficient use of radio resources.

BDS SD—Broadcast Distribution System Service Distribution

Responsible for the coordination and delivery of broadcast services to the BDS for delivery to the terminal, including file and streaming distribution, and Service Guide distribution.

BSDA and BSD/A—BCAST Service Distribution and AdaptationResponsible for the aggregation and delivery of BCAST Services, and performs the adaptation of the BCAST Enabler to underlying Broadcast Distribution Systems.

BSA—BCAST Service Application

Represents the service application of the BCAST Service, such as streaming audio/video or movie download.

IN—Interaction Network

A system containing the ability to transmit, for example IP flow, SMS, MMS, through Interaction Channel to a Terminal device and transmitting user's responses through Interaction Channel to a BCAST Service Application. A system containing the ability to transmit IP flow through Interaction Channel to a Terminal device.

BSM—BCAST Subscription Management

Responsible for service provisioning such as subscription and payment related functions, the provision of information used for BCAST Service reception, and BCAST device management.

SGDD Service Guide Delivery Descriptor

SGDU Service Guide Delivery Unit

Figure 1:
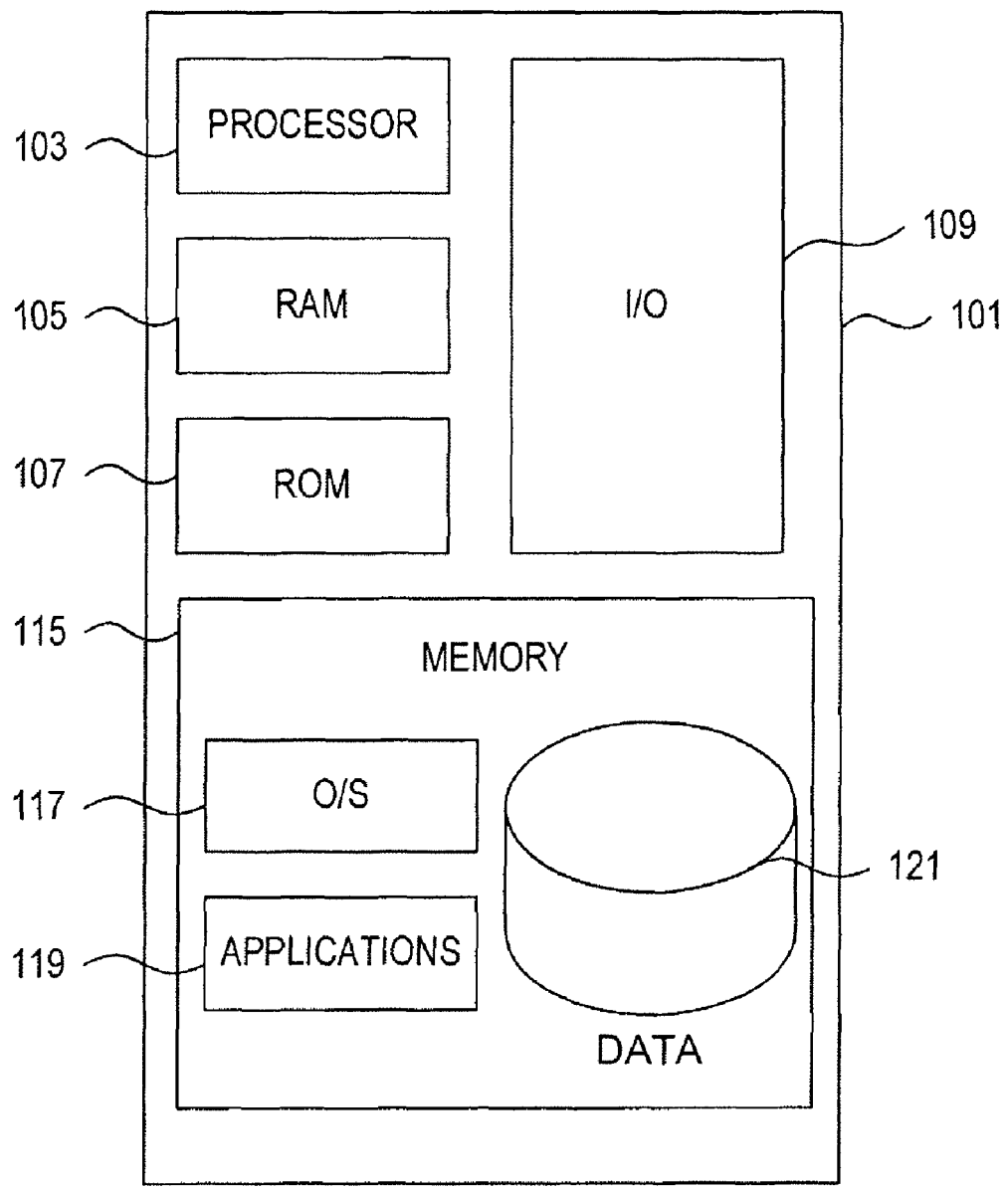
FIG. 1 is a block diagram illustrating a computing device, in accordance with aspects of the present invention.

FIG. 1 illustrates a block diagram of a generic terminal device 101 that may be used according to an illustrative embodiment of the invention. Device 101 may have a processor 103 for controlling overall operation of the terminal device and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output.

Memory 115 may store software used by device 101, such as an operating system 117, application programs 119, and associated data 121. For example, one application program 121 used by device 101 according to an illustrative embodiment of the invention may include computer executable instructions for invoking user functionality related to communication, such as email, short message service (SMS), and voice input and speech recognition applications.

Device 101 may also be a mobile terminal including various other components, such as a battery, speaker, and antennas (not shown). I/O 109 may include a user interface including such physical components as a voice interface, one or more arrow keys, joy-stick, data glove, mouse, roller ball, touch screen, or the like. In this example, the memory 115 of mobile device 101 may be implemented with any combination of read only memory modules or random access memory modules, optionally including both volatile and nonvolatile memory and optionally being detachable. Software may be stored within memory 115 and/or storage to provide instructions to processor 103 for enabling mobile terminal 101 to perform various functions. Alternatively, some or all of mobile terminal 101 computer executable instructions may be embodied in hardware or firmware (not shown).

Additionally, a mobile terminal 101 may be configured to send and receive transmissions through various device components, such as an FM/AM radio receiver, wireless local area network (WLAN) transceiver, and telecommunications transceiver (not shown). In one aspect of the invention, mobile terminal 101 may receive radio data stream (RDS) messages. Mobile terminal 101 may be equipped with other receivers/transceivers, e.g., one or more of a Digital Audio Broadcasting (DAB) receiver, a Digital Video Broadcasting (DVB) receiver, a Digital Radio Mondiale (DRM) receiver, a Forward Link Only (FLO) receiver, a Digital Multimedia Broadcasting (DMB) receiver, etc. Hardware may be combined to provide a single receiver that receives and interprets multiple formats and transmission standards, as desired. That is, each receiver in a mobile terminal 101 may share parts or subassemblies with one or more other receivers in the mobile terminal device, or each receiver may be an independent subassembly.

The invention is described through three separate solutions. Any combination of these solutions is also possible. One common starting assumption is a situation where a terminal acquires Service Guide Delivery Descriptors (SGDDs). The SGDDs are enhanced according to an aspect of this invention so that the subelement BSMSelector of the SGDD contains subelement RoamingQueryAddress. A fully modified BSMSelector according to this invention is presented in the end of this section.

Solution 1—Request/Reply Solution Addressing the Case of Terminal Not Having "home" BSM.

Addressing problem (1): Since the terminal does not have any "home" BSM, i.e. no BSMFilterCodes, there is no way of telling when the terminal is roaming merely by receiving the SGDDs. In that case, it can be assumed that the terminal is always roaming. However, the following statement in the prior art is flawed: "If the terminal or smartcard does not have a matching BSMFilterCode in any of the SGDD's in this network, the terminal MAY select any BSMSelector and might only use the SGDU's of DescriptorEntries with the selected BSMSelector, until it selects another BSMSelector."

In a realistic operational setting this rarely is true, since it ignores the roaming agreements between operators (i.e. BSMs). Thus, problems (2) and (3) remain.

Addressing problem (2) and (3):
1. A terminal acquires SGDDs (either receiving over broadcast Service Guide Announcement Channel or by retrieving those otherwise).
2. From the acquired SGDDs the terminal compiles a set of pairs of {BSMFilterCode, RoamingQueryAddress}.
3. For each BSMFilterCode, the terminal sends RoamingQueryRequest to the RoamingQueryAddress associated with the BSMFilterCode. One way to do this is to send all the requests simultaneously (i.e. without waiting for responses). Another way is to send the responses in priority order, one by one, first request then response, then next request, etc. Such priority order may be according to prior experience (e.g., the terminal sends requests to such BSMFilterCodes first that have been responding positively before.). Further, irrespective which way to send requests, the terminal sets a time-out timer for the requests.
4. After receiving RoamingQueryAnswers from BSMs, or, upon timeout of request message timer set in step 3, the terminal starts to analyze the received answers.
5. The terminal analyzes the received RoamingQueryAnswers especially comparing the Rule elements in the answers (A) among the answers; or (B) against the set of services, content, programs the terminal is currently receiving; or (C) against the list of service, content or programs that are in the "favorites" list of the terminal; or (D) against a specific time period terminal wishes to access services; or (E) against some other criteria such as selecting BSMs that offer the most fragments, cheapest service or where the fragment/cost ratio is best. Any combination of (A) to (E) is also naturally possible. For items (B) and (C), the comparison can be based on FragmentIDs or GlobalServiceID since these identifiers are the common element in the Rules and in the Service Guides, i.e. a Rule that is defined in terms of FragmentID can be mapped to Service Guide.
6. Based on analysis, a terminal determines which BSM(s) it will use while roaming.
7. After selection, based on Rules, the terminal may refresh the Service Guide view as displayed to the user. The terminal may filter out/gray elements that are not available and may show the selected BSM id in the screen or in the menu. Alternately the terminal can list the available successfully resolved BSMs under a pull down menu where the key is either BSMid or any of the criteria (A)-(E) listed in step 5.

The following provides more detailed information related to some of the concepts introduced above.

RoamingQueryRequest is a message logically containing the following information:
Optional terminal ID
Optional home "BSM" identification (one, some or all of terminals BSMFilterCodes and their types such aif they are smart card codes or not)
Optional list of Service Guide fragment ids or GlobalServiceIds, or GlobalContentIds that terminal wants to access on while roaming.

RoamingQueryResponse is a message logically containing the following information:
Answering BSMid as BSMFilterCode
Optional response code for faster terminal processing:
ALL ALLOWED—meaning: no restrictions while roaming
NOT ALLOWED—meaning: roaming not possible
ALLOWED WITH RULES—meaning: see the rules of the payload Optional Rules is a combination of one or several of the following:
ALLOW FRAGMENT ID<list of fragment ids>
ALLOW GLOBAL SERVICE ID<list of global service ids>
ALLOW GLOBAL CONTENT ID<list of global content ids>
DENY FRAGMENT ID<list of fragment ids>
DENY GLOBAL SERVICE ID<list of global service ids>
DENY GLOBAL CONTENT ID<list of global content ids>
ALLOW TIME PERIOD<start time UTC><end time UTC>
DENY TIME PERIOD<start time UTC><end time UTC>
COST INFORMATION for any of the above rules RoamingQueryRequest and RoamingQueryResponse can be instatiated as binary structure, XML or any other known message type. The protocol to convey RoamingQueryRequest and RoamingQueryResponse can be any data network protocol—for example UDP, TCP, HTPP, SOAP.

Solution 2—Request/Reply solution addressing the case of the terminal having a "home" BSM. This solution is almost identical to the Solution 1. The only difference in the start conditions is that the terminal has a "home" BSM(s), i.e. it has one or more BSMFilterCodes.

Addressing problem (1): Since the terminal has one or more "home" BSMs, i.e. no BSMFilterCodes, there is a way of telling when the terminal is roaming just by receiving the SGDDs. The terminal simply compares its BSMFilterCodes to the ones present in the SGDDs. If any of the terminal's BSMFilterCodes are present in SGDD, the terminal is not roaming. Otherwise the terminal is roaming. For the roaming case, problems (2) and (3) may still remain. Those problems can be solved in an identical manner to Solution 1.

Solution 3—Device Management/Terminal Provisioning Based Solution. In this solution the terminal is provisioned—using a terminal provisioning function such as OMA Device Management—with roaming related information such as terminal's own BSMFilterCodes and other BSMFilterCodes together with associated Rules and possibly RoamingQueryAddresses to each BSMFilterCode. One or more, or even all entries of type {BSMFilterCode, Rule, RoamingQueryAddress} can be instantiated within a single Management Object.

Figure 2:
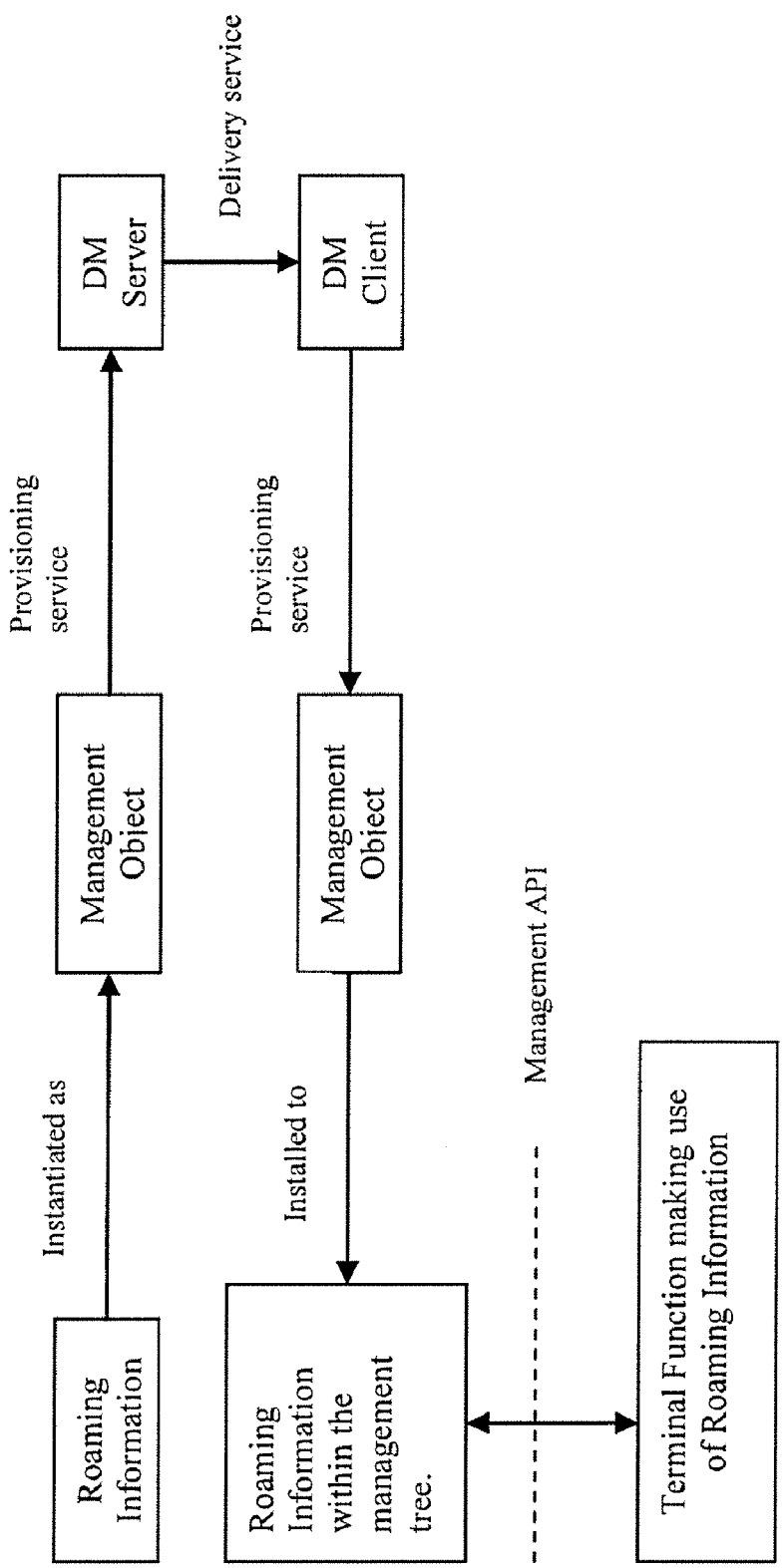
FIG. 2 is a component diagram illustrating a terminal provisioning system, in accordance with aspects of the present invention.

Referring now to FIG. 2, a diagram is shown illustrating such a solution, in which roaming information is instantiated as OMA DM Management Objects and the Management Objects are delivered and provisioned to a terminal with OMA DM methods. This means that on the terminal, the Management Objects carrying the roaming information are "installed" into the management tree of the terminal. A roaming function, service guide function or any other function within the terminal can then access the roaming information using the methods defined for accessing the management object tree. FIG. 2 illustrates an end-to-end view of such a technique.

Below is a modified Service Guide Delivery Descriptor illustrated partially according to certain aspects of this invention.

| Name | Type | Category | Cardinality | Description | Data Type |
|---|---|---|---|---|---|
| ... | | | | | |
| BSMSelector | E3 | NO/TM | 0...N | This is a BSM code that allows a terminal to determine whether the SGDU's in this SGDD DescriptorEntry - among the SGDU's that are announced in various DescriptorEntries in various SGDD's - is associated with the terminal's affiliated BSM, In case the terminal is equipped with one or more BSMFilterCodes, the BSMSelector acts as an access filter for the SGDU's of the DescriptorEntry and the following applies: Usage in home network: The terminal might only use those SGDU's in the DescriptorEntry that have a matching BSMFilterCode. If the terminal has multiple matching BSMFilterCodes, the terminal MAY select one of the BSMSelectors with a matching BSMFilterCode and might then only use the SGDU's of DescriptorEntries with the selected BSMSelector, until it selects another BSMSelector. If the BSMSelector is not present the terminal might not use any of the SGDU's in the DescriptorEntry. Usage in roaming network: If the terminal has a matching BSMFilterCode in any of the SGDD's in this network, then the terminal might only use those SGDU's in the DescriptorEntry. If the terminal has multiple matching BSMFilterCodes, the terminal may select one of the | |

| Name | Type | Category | Cardinality | Description | Data Type |
|------|------|----------|-------------|-------------|-----------|
| | | | | BSMSelectors with a matching BSMFilterCode and might then only use the SGDU's of DescriptorEntries with the selected BSMSelector, until it selects another BSMSelector. If the terminal or smartcard does not have a matching BSMFilterCode in any of the SGDD's in this network, the terminal may select any BSMSelector and might only use the SGDU's of DescriptorEntries with the selected BSMSelector, until it selects another BSMSelector. If the BSMSelector is not present, the terminal can use all SGDU's in the DescriptorEntry. In case the terminal is not equipped with a BSMFilterCode, the following applies: Usage in home network: The terminal may select any BSMSelector that does not contain a BSMFilterCode, and might then only use the SGDU's of DescriptorEntries with the selected BSMSelector, until it selects another BSMSelector. Furthermore, the terminal might not use the SGDU's of DescriptorEntries that have a BSMSelector with a BSMFilterCode. If the BSMSelector is not present in any of the SGDD's the terminal can use all SGDU's in the DescriptorEntry. Usage in roaming network: The terminal may select any BSMSelector and might then only use the SGDU's of DescriptorEntries with the selected BSMSelector, until it selects another BSMSelector. If the BSMSelector is not present in any of the SGDD's the terminal can use all SGDU's in the | |

| Name | Type | Category | Cardinality | Description | Data Type |
|---|---|---|---|---|---|
| | | | | DescriptorEntry. BSMSelector contains the following attributes: id RoamingQueryAddress BSMSelector contains the following elements: BSMFilterCode name | |
| id | A | NM/TM | 1 | Identifier of the BSMSelector, unique within the network | AnyURI |
| BSMFilterCode | E4 | NO/TM | 0...1 | The code that specifies this BSMSelector. Contains the following attribute: type | String |
| type | A | NM/TM | 1 | The type of BSMFilterCode. 1 - BSMCode (Smart Card Code) This is used if the determination is made based on the country and operator code in the (U)SIM/(R-)UIM/CSIM 2 - BSMCode (Non Smart Card Code): This is used if the determination is made based on the country and operator code in the terminal Other values are reserved. | unsignedByte |
| Name | E4 | NM/TM | 1...N | Provides a user readable name for the BSMSelector, possibly in multiple languages. The language is expressed using built-in XML attribute xml:lang with this element... This attribute can be used to provide information to the user so he can select the BSMSelector the terminal has to use. | String |
| RoamingQueryAddress | A | NM/TM | 1...N | Address to which the terminal MAY send the RoamingQueryRequest | anyURI |

Broadcast Roaming allows a user to receive Broadcast Services from a Broadcast Service Provider different from his Home Broadcast Service Provider. The following main scenario can be provided for Broadcast Roaming. At any point of time the user may want to access the Broadcast Services from a Visited Mobile Service Provider. There are many possible reasons for this. For example, the user may not be able to access the services provided by the Home Mobile Broadcast Service Provider. In this case, Broadcast Roaming allows the user to receive Broadcast Services from another Broadcast Service Provider independent of the underlying Broadcast Distribution System.

The Mobile Broadcast Services (BCAST) 1.0 Enabler enables Broadcast Roaming through the use of a Service Guide, through roaming signaling between Terminal and Visited Mobile Broadcast Service Provider, through roaming signaling between Visited Mobile Broadcast Service Provider and Home Mobile Broadcast Service Provider and through the Terminal Provisioning function. The following gives an overview of the components:

Service Guide Delivery Descriptors (SGDD) within the Service Guide declare the existence of and availability of Service Guide fragments. The SGDD allows one to declare which fragments are associated with which Mobile Broadcast Service Provider (through use of BSMFilterCodes). Related to this signaling, there are also filtering rules in the Service Guide specification that the terminals are expected to comply with. Further, SGDD enables a method to convey points of contact which the visiting terminals can contact in case Broadcast Roaming is needed. This aspect of Broadcast Roaming is normatively specified within the specification of SGDD in [BCAST10-ServiceGuide].

Terminal Provisioning enables the Home Broadcast Service Provider to maintain terminal-resident elements used by the roaming function. These elements include the list of Service Providers (their BSMFilterCodes) affiliated with the terminal as well as entry details of default roaming contact point—the server that terminal can send roaming requests in the case terminal does not find any other entry points within the Service Guide signaling. Finally, these elements include parameters that can be used to control terminal behavior: an element that controls whether roaming requests should always be sent to a Home BSM and an element that determines terminal behavior for fragments that are not associated with any BSMSelector. [These aspects of Broadcast Roaming are normatively specified within OMA-TS-BCAST_Services-V1_0-20060419-D, Appendix E (Management Object)].

Roaming request and response messages between a terminal and BSM associated with Home and/or Visited Mobile Broadcast Service Provider allow terminals to request and Broadcast Service Providers to provide the rules related to roaming. Further, these messages allow a terminal to request access to purchase items while roaming. [This aspect of Broadcast Roaming is normatively specified within OMA-TS-BCAST_Services-V1_0-20060419-D (section 5.8.1)]. The contact points for the request messages are signaled within the SGDDs—that aspect of Broadcast Roaming is normatively specified within the specification of SGDD in [OMA-TS-BCAST_ServiceGuide-V1_0_0-20060324-D]

The roaming messages between Home and Visited Mobile Broadcast Service Providers allow the either the Home or Visited Mobile Broadcast Service Provider to initiate the roaming as a reaction to initial user roaming request. [This aspect of Broadcast Roaming is normatively specified within OMA-TS-BCAST_Services-V1_0-20060419-D (section 5.8.2)].

The informative walk-through of Broadcast Roaming is described below.

Roaming messages between Terminal and BSM

The terminal uses a RoamingRuleRequest to request the RoamingRules associated with BSMSelector (identified by the id of the selector). As a response, the Terminal receives RoamingRuleResponse that carry the RoamingRules.

RoamingRuleRequest

| Name | Type | Category | Cardinality | Description | Data Type |
|---|---|---|---|---|---|
| RoamingRuleRequest | E | | | | |
| UserID | E1 | M | 1 | A unique ID that may be used to identify the terminal in both the Home Service Provider and Visited Service Provider BCAST service area. An example is the 3GPP IMSI (International Mobile Subscriber Identity). | String |
| HomeBSMFilterCode | E1 | M | 1 | The code that specifies the Home BSM. Contains the following attribute: type | String |
| type | A | M | 1 | The type of BSMFilterCode. 1 - BSMCode (Smart Card Code) This is used if the determination is made based on the country and operator code in the (U)SIM/(R-)UIM/CSIM 2 - BSMCode (Non Smart Card Code): This is used if the determination is made based on the country and operator code in the terminal Other values are reserved. | unsignedByte |
| BSMSelectorId | E1 | M | 1...N | The identifier of BSMSelector terminal is requesting RoamingRules for. | anyURI |

RoamingRuleResponse

| Name | Type | Category | Cardinality | Description | Data Type |
|---|---|---|---|---|---|
| RoamingRuleResponse | E | | | | |
| ResponseEntry | E1 | M | 1...N | Entry containing response to each requested BSMSelectorId | |

-continued

| Name | Type | Category | Cardinality | Description | Data Type |
|---|---|---|---|---|---|
| BSMSelectorId | E2 | M | 1 | The identifier of BSMSelector for which terminal requested RoamingRules for and which this ResponseEntry is about. | anyURI |
| RoamingRule | E2 | M | 1 ... N | Entry specifying the RoamingRule associated with BSMSelector. | See Section 5.8.2.3 |
| Exclusive | E2 | O | 0 ... N | Indicates whether the rules are exclusive. If "TRUE", the rules are exclusive and terminal that accesses fragments covered by these rules (i.e. associated with the BSMSelectorId) might not access fragments associated with any other BSMSelectorId. | Boolean |

5.8.1.3 Definition of Element RoamingRule

| Name | Type | Category | Cardinality | Description | Data Type |
|---|---|---|---|---|---|
| RoamingRule | E | M | 1 | | |
| TimeFrame | E1 | O | 0 ... N | Rule that defines the time frame(s) this RoamingRule is applies to. | |
| StartTime | E2 | O | 0 ... 1 | Start of the time frame. If not given, the time frame is assumed to have started at some time in the past | int (32 bit) expressed as NTP time |
| EndTime | E2 | O | 0 ... 1 | End of the time frame. If not given, the time frame is assumed to end at some time in the future. | int (32 bit) expressed as NTP time |
| Allow PurchaseItemId | E1 | O | 0 ... N | Rule that allows the Terminal to use the listed PurchaseItems. | |
| PurchaseItemId | E2 | M | 1 ... N | PurchaseItemID that is allowed to be interpreted, rendered and accessed. | anyURI |
| Allow Service | E1 | O | 0 ... N | Rule that allows the Terminal to use the fragments corresponding to listed GlobalServiceIDs. | |
| GlobalServiceID | E2 | M | 1 ... N | Fragments associated with this GlobalServiceID are allowed to be interpreted, rendered and accessed. | anyURI |
| Allow Content | E1 | O | 0 ... N | Rule that allows the Terminal to use the fragments corresponding to listed ContentIDs. | |
| GlobalContentID | E2 | M | 1 ... N | Fragments associated with this GlobalContentID are allowed to be interpreted, rendered and accessed. | anyURI |
| Deny PurchaseItemId | E1 | O | 0 ... N | Rule that denies the Terminal to use the listed PurchaseItems. | |
| PurchaseItemId | E2 | M | 1 ... N | PurchaseItemID that is denied to be interpreted, rendered and accessed . . . | anyURI |
| Deny Service | E1 | O | 0 ... N | Rule that denies the Terminal to use the fragments corresponding to listed GlobalServiceIDs. | |
| GlobalServiceID | E2 | M | 1 ... N | Fragments associated with this GlobalServiceID are denied to be interpreted, rendered and accessed. | anyURI |
| Deny Content | E1 | O | 0 ... N | Rule that denies the Terminal to use the fragments corresponding to listed ContentIDs. | |
| GlobalContentID | E2 | M | 1 ... N | Fragments associated with this GlobalContentID are denied to be interpreted, rendered and accessed. | anyURI |

Roaming messages between Home BSM and Visited BSM

In case the user selects to purchase or subscribe to a PurchaseItem that is associated with a BSM that is not one of the Home BSMs associated with the terminal, the terminal sends a normal Service Provisioning message. The receiving system determines from the requested PurchaseItemId and included UserID whether the request is about roaming. Two cases for this exist: either the Terminal sends the Service Provisioing message to its Home BSM or to the Visited BSM.

In the former case, the Home BSM detects that one of its terminals is requesting a PurchaseItem served by another BSM. If the Home BSM wants to allow terminal to access the PurchaseItem, the Home BSM goes ahead and sends RoamingAuthorizationRequest to the Visited BSM. The Visited BSM answers with RoamingAuthorizationResponse.

In the latter case, the Visited BSM detects that a terminal that is not one of the terminals affiliated with this BSM is requesting a PurchaseItem served by this BSM. The Visited BSM consequently sends RoamingAuthorizationRequest to the Home BSM of the Terminal. The Home BSM answers with RoamingAuthorizationResponse.

Protocol stack for message exchanges between BSMs

Figure 3:
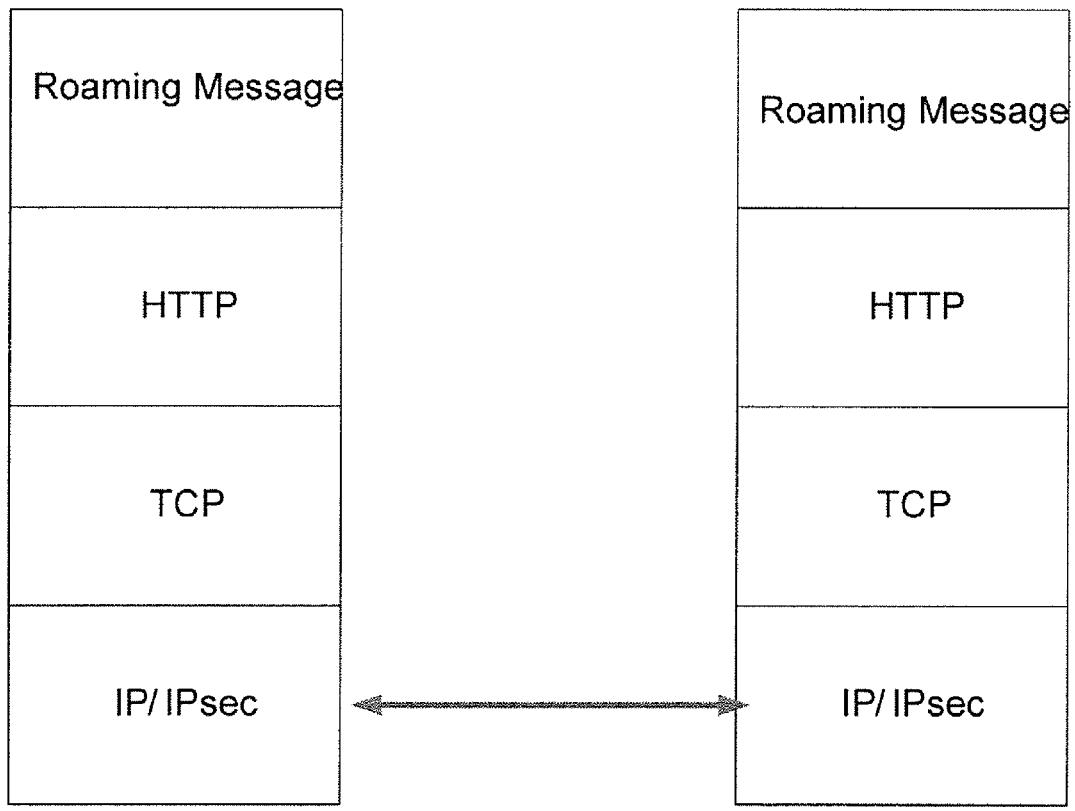
FIG. 3 is a block diagram showing an illustrative protocol stack used for message exchange, in accordance with aspects of the present invention.

Referring now to FIG. 3, an illustrative protocol stack is shown that may be used for message exchange between BSMs. In this example, HTTP over TCP/IP may be used for the delivery of the roaming procedure authorization messages. IPsec may be used in conjunction with TCP/IP to provide secure delivery of the authorization messages.

RoamingAuthorizationRequest

| Name | Type | Category | Cardinality | Description | Data Type |
|---|---|---|---|---|---|
| RoamingAuthorizationRequest | E | | | | |
| UserID | E1 | M | 1 | A unique ID that may be used to identify the terminal in both the Home Service Provider and Visited Service Provider BCAST service area. An example is the 3GPP IMSI (International Mobile Subscriber Identity). | String |
| HomeBSMFilterCode | E1 | M | 1 | The code that specifies the Home BSM. Contains the following attribute: type | String |
| type | A | M | 1 | The type of BSMFilterCode. 1 - BSMCode (Smart Card Code) This is used if the determination is made based on the country and operator code in the (U)SIM/(R-)UIM/CSIM 2 - BSMCode (Non Smart Card Code): This is used if the determination is made based on the country and operator code in the terminal Other values are reserved. | unsignedByte |
| VisitedBSMFilterCode | E1 | M | 1 | The code that specifies the Visited BSM. Contains the following attribute: type | String |
| type | A | M | 1 | The type of BSMFilterCode. 1 - BSMCode (Smart Card Code) This is used if the determination is made based on the country and operator code in the (U)SIM/(R-)UIM/CSIM 2 - BSMCode (Non Smart Card Code): This is used if the determination is made based on the country and operator code in the terminal Other values are reserved. | unsignedByte |
| TerminalSubscriptionType | E1 | M | 1 | A field that may indicate the subscription scope of the terminal in terms of roaming. The Home Service Provider and the Visited Service Provider have a common understanding of the field according to roaming agreements between them. This element is not further specified in this specification. | anyURI |
| PurchaseItemID | E1 | M | 1 ... N | Set of PurchaseItems which are associated with the VisitedBSM and which the terminal wants to subscribe to/purchase. | anyURI |

RoamingAuthorizationResponse

| Name | Type | Category | Cardinality | Description | Data Type |
|---|---|---|---|---|---|
| RoamingAuthorizationResponse | E | | | | |
| UserID | E1 | M | 1 | A unique ID that may be used to identify the terminal in both the Home Service Provider and Visited Service Provider BCAST service area. An example is the 3GPP IMSI (International Mobile Subscriber Identity). | String |
| HomeBSMFilterCode | E1 | M | 1 | The code that specifies the Home BSM. Contains the following attribute: type | String |
| type | A | M | 1 | The type of BSMFilterCode. 1 - BSMCode (Smart Card Code) This is used if the determination is made based on the country and operator code in the (U)SIM/(R-)UIM/CSIM 2 - BSMCode (Non Smart Card Code): This is used if the determination is made based on the country and operator code in the terminal Other values are reserved. | unsignedByte |
| VisitedBSMFilterCode | E1 | M | 1 | The code that specifies the Visited BSM. Contains the following attribute: type | String |
| type | A | M | 1 | The type of BSMFilterCode. 1 - BSMCode (Smart Card Code) This is used if the determination is made based on the country and operator code in the (U)SIM/(R-)UIM/CSIM 2 - BSMCode (Non Smart Card Code): This is used if the determination is made based on the country and operator code in the terminal Other values are reserved. | unsignedByte |
| PurchaseItemID | E1 | M | 1 . . . N | Set of PurchaseItems which are associated with the VisitedBSM and which the terminal wants to subscribe to/purchase. | anyURI |
| RoamingAuthorisationStatus | E2 | M | 1 | A field that may indicate whether the roaming terminal has been authorised for requested PurchaseItem or not. Note: The codes in table 1 are be used | UnsignedByte |

Figure 4:
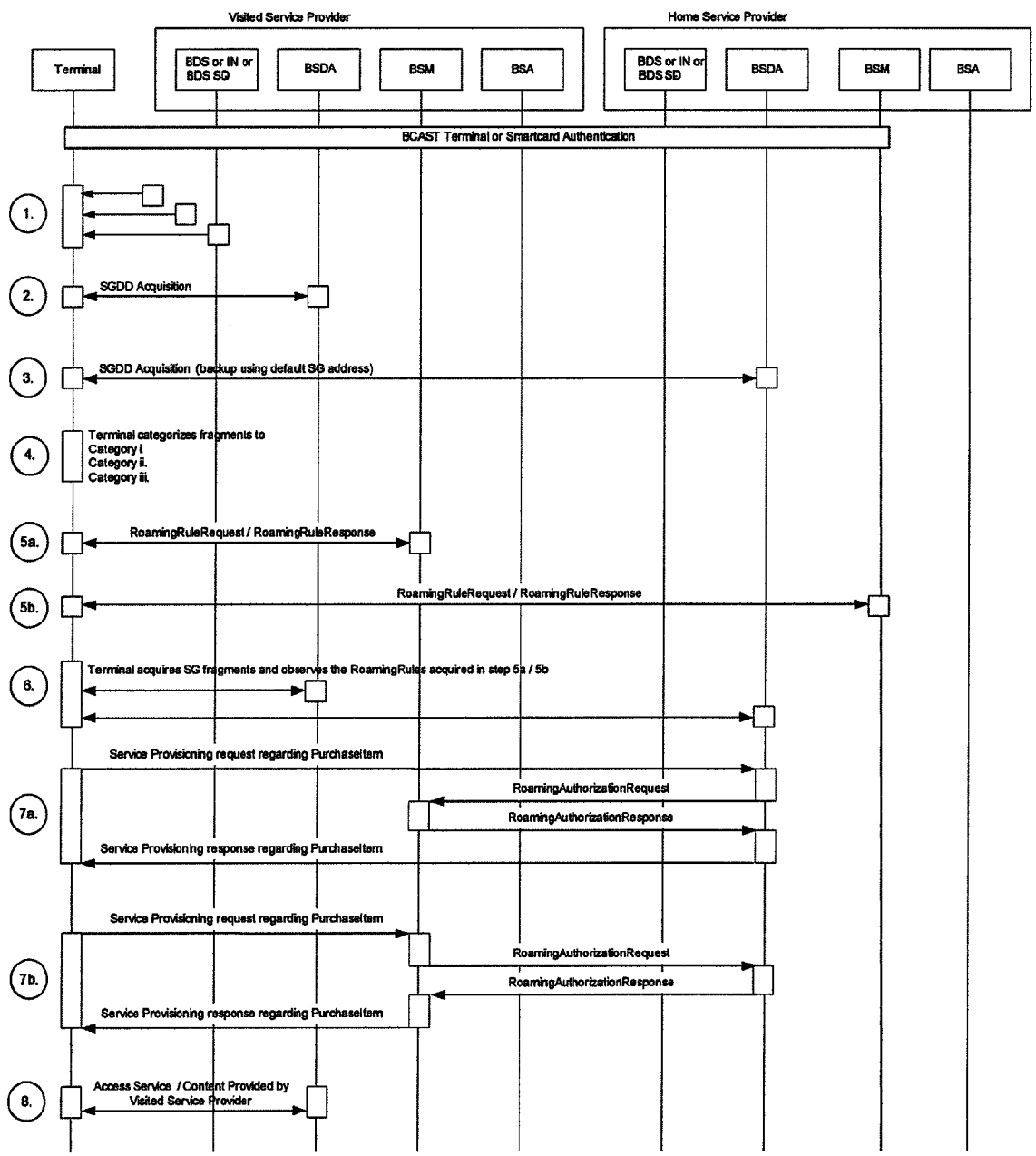
FIG. 4 is a diagram illustrating a broadcast roaming technique, in accordance with certain aspects of the present invention.

Referring now to FIG. 4, an illustrative walk-through of a broadcast roaming technique is shown, the steps of which are described below in greater detail. Specifically, this example illustrates how broadcast roaming may achieved through the use of core functionalities of BCAST 1.0. This informative explanation of broadcast roaming is presented as a walk-through mainly from the terminal point of view.

1. The terminal scans or otherwise detects an available Broadcast Distribution Systems (BDS).
2. The terminal attempts to perform a service discovery bootstrap to locate an entry point to BCAST Service Guide on all or any of the detected BDSes. Upon successful completion of a bootstrap procedure, the terminal acquires the entry point to BCAST Service Guide over the respective bearer. Consequently, the terminal acquires SGDDs either by receiving or by retrieving those.
3. In case the terminal fails to perform a bootstrap and to locate the entry point to BCAST Service Guide over all the detected BDSes, the terminal attempts to retrieve SGDDs using the entry point as provisioned in the Terminal (defined by Management Object "<X>/SGServerAddress").
4. Once the terminal acquires SGDDs, the terminal looks for BSMSelector elements and BSMFilterCodes within those elements in the SGDD. Together with that information and the terminal's affiliated BSM(s) which are represented within the Terminal as Management Objects with identifier '<X>/BSMFilterCode', the Terminal categorizes all the fragments declared in the SGDD into three categories:
    i. Fragments that are associated with a BSMFilterCode (within BSMSelector), which match at least one of the BSMFilterCodes associated with the terminal. The terminal can use, interpret and render the information contained in these fragments without restrictions.
    ii. Fragments that are associated with a BSMFilterCode (within BSMSelector), which does not match with any of the BSMFilterCodes associated with the terminal. The terminal can render, interpret and handle the fragments according to RoamingRules associated with this BSMSelector. BSMSelector and the associated RoamingRules are identified by the attribute "Id" present within the BSMSelector as well as in RoamingRules.

iii. Fragments that are not associated with any BSMFilterCode (no BSMSelector).

In case a terminal has no Management Objects with identifier '<X>/BSMFilterCode' present, the terminal can use, interpret and render the information contained in these fragments without restrictions.

In case the terminal has at least one Management Object with identifier '<X>/BSMFilterCode' present, the terminal will determine behavior according to Management Objects with identifier '<X>/IgnoreUnIdentifiedBSM'.

If the Management Objects with identifier '<X>/IgnoreUnIdentifiedBSM' is set with value "TRUE" the terminal cannot use, interpret and render the information contained in these fragments at all.

If the Management Objects with identifier '<X>/IgnoreUnIdentifiedBSM' is set with value "FALSE" the terminal can use, interpret and render the information contained in these fragments without restrictions.

If the Management Objects with identifier '<X>/IgnoreUnIdentifiedBSM' is not present, the terminal assumes that the value of such Management Object is "FALSE".

5. If the terminal needs to render, interpret and handle the fragments in category (ii.) above, it acquires the RoamingRules related to the BSMSelector in question. There are three ways to achieve this.

a. The terminal fetches the RoamingRules from the Visited BSM. For that, the BSMSelector contains attribute "RoamingRuleRequestAddress" to which the terminal can address the RoamingRuleRequest. As a response of to the RoamingRuleRequest the terminal will receive RoamingRuleResponse which contains the RoamingRules associated with the BSMSelector.

b. The terminal fetches the RoamingRules from the Home BSM. This happens if the BSMSelector does not have "RoamingRuleRequestAddress" present, OR, if the terminal has Management Object "<X>/ForceHomeRoamingRuleRequestAddress" present and set to "TRUE". In these cases the terminal sends the RoamingRuleRequest to "<X>/HomeRoamingRuleRequestAddress". As a response of to the RoamingRuleRequest the terminal will receive RoamingRuleResponse which contains the RoamingRules associated with the BSMSelector.

c. The RoamingRules were originally provided as a part of BSMSelector (not illustrated in FIG. 4).

6. The terminal acquires Service Guide fragments. It interprets handles and renders the fragments according to RoamingRules. Consequently the terminal uses the Service Guide fragments to perform subscriptions to services and content, and to access services and content described by the Service Guide.

7. In case the user selects to purchase or subscribe to a PurchaseItem that is associated with a BSM that is not one of the Home BSMs associated with the terminal, the terminal sends a normal Service Provisioning message. The receiving system determines from the requested PurchaseItemId and included UserID whether the request is about roaming. Two cases for this exist: either the terminal sends the Service Provisioing message to its Home BSM or to the Visited BSM.

a. In the former case, the Home BSM detects that one of its terminals is requesting a PurchaseItem served by another BSM. If the Home BSM wants to allow the terminal to access the PurchaseItem, the Home BSM goes ahead and requests RoamingAuthorization from the Visited BSM.

b. In the latter case, the Visited BSM detects that a terminal that is not one of the terminals affiliated with this BSM is requesting PurchaseItem served by this BSM. The Visited BSM consequently requests RoamingAuthorization from the Home BSM of the terminal. Upon successful RoamingAuthorization, the terminal is granted the right to purchase and/or subscribe to the PurchaseItem it requested.

8. The terminal accesses service and/or content related to PurchaseItem, provided by Visited Service Provider.

While illustrative systems and methods as described herein embodying various aspects of the present invention are shown, it will be understood by those skilled in the art, that the invention is not limited to these embodiments. Any of the steps described herein may be implemented as computer-executable instructions embodied in a computer-readable medium, such as a computer disk or memory.

Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

The invention claimed is:

1. A method comprising:

sending, by a terminal, a roaming rule request to at least one service provider, wherein the at least one service provider includes at least one of a visited service provider and a home service provider;

receiving a roaming rule response from the at least one service provider, wherein the roaming rule response specifies a roaming rule that indicates which of a plurality of service guide fragments the terminal is permitted to access;

acquiring service guide fragments from the at least one service provider in accordance with the roaming rule and processing the service guide fragments;

sending, to the home service provider or the visited service provider, a service provisioning request for a purchase item, wherein the service provisioning request includes a purchase item identifier and a user identifier;

receiving, from the home service provider or the visited service provider, a service provisioning response regarding the purchase item; and accessing at least one of a service and content related to the purchase item, wherein the at least one of a service and content is provided by the visited service provider.

2. The method of claim 1, wherein the roaming rule request specifies a type of home broadcast subscription management filter code that specifies either a smart-card-code type or a non-smart-card-code type.

3. The method of claim 1, wherein the roaming rule response specifies a response entry that contains a response to each requested broadcast subscription management selector identifier and a broadcast subscription management selector identifier that identifies a broadcast subscription management selector for which roaming rules were requested and to which a particular response entry pertains.

4. The method of claim 3, wherein the roaming rule response specifies whether the roaming rules exclude accessing fragments from other broadcast subscription management selector identifiers.

5. The method of claim 1, wherein the roaming rule response includes at least one roaming rule that specifies, for the roaming rule, at least one of: a time frame, a start time, an end time, an allowed purchase item identifier, an allowed service global service identifier, an allowed content global content identifier, a denied purchase item identifier, a denied service global service identifier, and a denied content global content identifier.

6. An apparatus comprising:

a processor; and a memory containing executable instructions, the memory and the instructions configured to, with the processor, cause the apparatus at least to:

send a roaming rule request to at least one service provider, wherein the at least one service provider includes at least one of a visited service provider and a home service provider;

receive a roaming rule response from the at least one service provider, wherein the roaming rule response specifies a roaming rule that indicates which of a plurality of service guide fragments the apparatus is permitted to access;

acquire service guide fragments from the at least one service provider in accordance with the roaming rule and process the service guide fragments;

send, to the home service provider or the visited service provider, a service provisioning request for a purchase item, wherein the service provisioning request includes a purchase item identifier and a user identifier;

receive, from the home service provider or the visited service provider, a service provisioning response regarding the purchase item; and access at least one of a service and content related to the purchase item, wherein the at least one of a service and content is provided by the visited service provider.

7. The apparatus of claim 6, wherein the roaming rule request specifies a type of home broadcast subscription management filter code that specifies either a smart-card-code type or a non-smart-card-code type.

8. The apparatus of claim 6, wherein the roaming rule response specifies a response entry that contains a response to each requested broadcast subscription management selector identifier and a broadcast subscription management selector identifier that identifies a broadcast subscription management selector for which roaming rules were requested and to which a particular response entry pertains.

9. The apparatus of claim 8, wherein the roaming rule response specifies whether the roaming rules exclude accessing fragments from other broadcast subscription management selector identifiers.

10. The apparatus of claim 6, wherein the roaming rule response includes at least one roaming rule that specifies, for the roaming rule, at least one of: a time frame, a start time, an end time, an allowed purchase item identifier, an allowed service global service identifier, an allowed content global content identifier, a denied purchase item identifier, a denied service global service identifier, and a denied content global content identifier.

11. A method comprising:

processing, by a processor, a roaming rule request received from a terminal;

sending to the terminal a roaming rule response, wherein the roaming rule response specifies a roaming rule that indicates which of a plurality of service guide fragments the terminal is permitted to access;

exchanging with a home service provider of the terminal a roaming authorization request regarding a purchase item and a roaming authorization response regarding the purchase item; and providing to the terminal at least one of a service and content related to the purchase item.

12. The method of claim 11, further comprising: receiving from the terminal a service provisioning request regarding the purchase item, wherein the service provisioning request includes a purchase item identifier and a user identifier.

13. The method of claim 11, further comprising: sending to the terminal a service provisioning response regarding the purchase item.

14. The method of claim 11, wherein the roaming authorization request includes a home broadcast subscription management filter code that specifies either a smart-card-code type or a non-smart-card-code type and a visited broadcast subscription management filter code that specifies either a smart-card-code type or a non-smart-card-code type.

15. The method of claim 11, wherein the roaming authorization response includes a user identifier configured for use by a visited service provider and the home service provider of the terminal in uniquely identifying the terminal, a home broadcast subscription management filter code that specifies either a smart-card-code type or a non-smart-card-code type, a visited broadcast subscription management filter code that specifies either a smart-card-code type or a non-smart-cardcode type, and a purchase item identifier that specifies a set of selected purchase items that are associated with the visited service provider.

16. An apparatus comprising:
a processor; and
a memory containing executable instructions, the memory and the instructions configured to, with the processor, cause the apparatus at least to:
receive a roaming rule request from a terminal;
send to the terminal a roaming rule response, wherein the roaming rule response specifies a roaming rule that indicates which of a plurality of service guide fragments the terminal is permitted to access;
exchange with a home service provider of the terminal a roaming authorization request regarding a purchase item and a roaming authorization response regarding the purchase item; and
provide to the terminal at least one of a service and content related to the purchase item.

17. The apparatus of claim 16, wherein the memory contains further executable instructions that, when executed, cause the apparatus to receive from the terminal a service provisioning request regarding the purchase item, wherein the service provisioning request includes a purchase item identifier and a user identifier.

18. The apparatus of claim 16, wherein the memory contains further executable instructions that, when executed, cause the apparatus to send to the terminal a service provisioning response regarding the purchase item.

19. The apparatus of claim 16, wherein the roaming authorization request includes a home broadcast subscription management filter code that specifies either a smart-card-code type or a non-smart-card-code type and a visited broadcast subscription management filter code that specifies either a smart-card-code type or a non-smart-card-code type.

20. The apparatus of claim 16, wherein the roaming authorization response includes a user identifier configured for use by a visited service provider and the home service provider of the terminal in uniquely identifying the terminal, a home broadcast subscription management filter code that specifies either a smart-card-code type or a non-smart-card-code type, a visited broadcast subscription management filter code that specifies either a smart-card-code type or a non-smart-card-code type, and a purchase item identifier that specifies a set of selected purchase items that are associated with the visited service provider.

21. An apparatus comprising:
a processor; and
a memory containing executable instructions, the memory and the instructions configured to, with the processor, cause the apparatus at least to:
receive a roaming rule request from a terminal;
send to the terminal a roaming rule response, wherein the roaming rule response specifies a roaming rule that indicates which of a plurality of service guide fragments the terminal is permitted to access; and
exchange with a visiting service provider of the terminal a roaming authorization request regarding a purchase item and a roaming authorization response regarding the purchase item.

22. The apparatus of claim 21, wherein the memory contains further executable instructions that, when executed, cause the apparatus to receive from the terminal a service provisioning request regarding the purchase item, wherein the service provisioning request includes a purchase item identifier and a user identifier.

23. The apparatus of claim 21, wherein the memory contains further executable instructions that, when executed, cause the apparatus to send to the terminal a service provisioning response regarding the purchase item.

24. The apparatus of claim 21, wherein the roaming authorization request includes a home broadcast subscription management filter code that specifies either a smart-card-code type or a non-smart-card-code type and a visited broadcast subscription management filter code that specifies either a smart-card-code type or a non-smart-card-code type.

25. The apparatus of claim 21, wherein the roaming authorization response includes a user identifier configured for use by a visited service provider and the home service provider of the terminal in uniquely identifying the terminal, a home broadcast subscription management filter code that specifies either a smart-card-code type or a non-smart-card-code type, a visited broadcast subscription management filter code that specifies either a smart-card-code type or a non-smart-card-code type, and a purchase item identifier that specifies a set of selected purchase items that are associated with the visited service provider.

26. A memory storing computer executable instructions that, when executed, cause an apparatus at least to:
send a roaming rule request to at least one service provider, wherein the at least one service provider includes at least one of a visited service provider and a home service provider;
receive a roaming rule response from the at least one service provider, wherein the roaming rule response specifies a roaming rule that indicates which of a plurality of service guide fragments the apparatus is permitted to access;
acquire service guide fragments from the at least one service provider in accordance with the roaming rule and process the service guide fragments;
send to the home service provider a service provisioning request for a purchase item, wherein the service provisioning request includes a purchase item identifier and a user identifier;
receive from the home service provider a service provisioning response regarding the purchase item; and
access at least one of a service and content related to the purchase item, wherein the at least one of a service and content is provided by the visited service provider.

27. The memory of claim 26, wherein the roaming rule request specifies a type of home broadcast subscription management filter code that specifies either a smart-card-code type or a non-smart-card-code type.

28. A memory storing computer executable instructions that, when executed, cause an apparatus at least to:
receive a roaming rule request from a terminal;
send to the terminal a roaming rule response, wherein the roaming rule response specifies a roaming rule that indicates which of a plurality of service guide fragments the terminal is permitted to access;
exchange with a home service provider of the terminal a roaming authorization request regarding a purchase item and a roaming authorization response regarding the purchase item; and
provide to the terminal at least one of a service and content related to the purchase item.

29. The memory of claim 28, wherein the executable instructions, when executed, cause the apparatus to receive from the terminal a service provisioning request regarding the purchase item, wherein the service provisioning request includes a purchase item identifier and a user identifier.

* * * * *